(12) United States Patent
Newswander

(10) Patent No.: US 8,292,537 B2
(45) Date of Patent: Oct. 23, 2012

(54) THERMAL EXPANSION COMPENSATION METHOD AND SYSTEM

(75) Inventor: Trent Newswander, Logan, UT (US)

(73) Assignee: Utah State University Research Foundation, North Logan, UT (US)

( * ) Notice: Subject to any disclaimer, the term of this patent is extended or adjusted under 35 U.S.C. 154(b) by 123 days.

(21) Appl. No.: 12/815,975

(22) Filed: Jun. 15, 2010

(65) Prior Publication Data

US 2010/0316437 A1 Dec. 16, 2010

Related U.S. Application Data

(60) Provisional application No. 61/187,309, filed on Jun. 16, 2009.

(51) Int. Cl.
  *C04B 37/02* (2006.01)
(52) U.S. Cl. .......................................... 403/30
(58) Field of Classification Search .............. 403/28–30; 248/678, 177.1, 178.1, 187.1, 346.01; 52/573.1, 52/717.02
See application file for complete search history.

(56) References Cited

U.S. PATENT DOCUMENTS

| | | | |
|---|---|---|---|
| 3,077,958 A | 2/1963 | Grimsey | |
| 3,412,551 A | 11/1968 | Swinzow | |
| 3,675,376 A | 7/1972 | Belew | |
| 4,074,473 A | 2/1978 | Nelson | |
| 4,493,378 A * | 1/1985 | Kyle | 174/152 GM |
| 4,826,303 A * | 5/1989 | Meier | 359/848 |
| 4,854,765 A * | 8/1989 | Giles | 403/30 |
| 6,173,996 B1 * | 1/2001 | Derakhshan et al. | 285/114 |
| 7,090,423 B2 * | 8/2006 | Natsuhara et al. | 403/28 |
| 7,416,362 B2 * | 8/2008 | North | 403/30 |
| 2006/0054767 A1 * | 3/2006 | Kemeny | 248/346.01 |
| 2008/0193201 A1 * | 8/2008 | Kwan et al. | 403/30 |
| 2009/0067917 A1 * | 3/2009 | Keith et al. | 403/30 |

* cited by examiner

*Primary Examiner* — Daniel P. Stodola
*Assistant Examiner* — Jonathan Masinick

(57) ABSTRACT

A method and system that compensates for thermal induced stresses in structures composed of different materials fastened together. The system utilizes three compensation mounts made from a material with a coefficient of thermal expansion that is between that of the two materials being fastened together. These mounts can be linear or, for a thinner structure, the mounts are "C" shaped. The size of the "C" mounts and fastening locations are calculated based on the coefficient of thermal expansion for the two materials being fastened together and the "C" mount material. The geometry of the "C" mounts allows for fastening the two planar surfaces without introducing a large thickness increase to the structure. This system allows for materials to be fastened together, and when placed in an environment with temperature fluctuations, the system experiences zero, minimal or insignificant amounts of thermal induced stress.

14 Claims, 8 Drawing Sheets

THERMAL EXPANSION COMPENSATION METHOD AND SYSTEM

RELATED APPLICATIONS

This application claims priority to U.S. Patent Application No. 61/187,309 filed on Jun. 16, 2009, which is incorporated herein by reference.

FIELD OF THE INVENTION

This invention relates to a method and system for compensating for the differences in the coefficient of thermal expansion of materials fastened together, and in particular to a method and system in which one material can be fastened to another material with no resultant thermal induced stress.

BACKGROUND OF THE INVENTION

When the temperature of a solid material is increased the material expands resulting in an increase in volume. When the temperature of a solid material is decreased the material contracts resulting in a decrease in volume. It is a well know fact that solid materials typically expand in response to heating and contract upon cooling. Materials expand because an increase in temperature results in greater thermal vibration of the atoms in the material and subsequently an increase in the average separation distance between adjacent atoms. The dimensional response of a solid material due to a change in temperature is characterized by the coefficient of thermal expansion (CTE). The linear CTE describes the magnitude of expansion as a function of increased temperature and is expressed as follows:

$$\alpha = \frac{\Delta l}{l \Delta T}.$$

where
   $\alpha$=CTE
   $\Delta l$=change in length
   l=initial length, and
   $\Delta T$=change in temperature.
For an area expansion in which the area, $A=l^2$ $$\frac{\Delta A}{A} = 2\alpha \Delta T$$

where
   $\Delta A$=change in area
   A=initial area,
   $\Delta T$=change in temperature, and
   $\alpha$=CTE.
For a volume expansion $$\frac{\Delta V}{V} = 3\alpha \Delta T$$

where
   $\Delta V$=change in volume
   V=initial volume
   $\Delta T$=change in temperature, and
   $\alpha$=CTE.

The magnitude of the CTE depends on the atomic structure and bonding of the material. A weakly bonded solid will have a higher CTE than a strongly bonded solid. Different materials have different binding forces and thus different rates of expansion upon heating. For example, strongly bonded insulators, such as ceramics, have relatively low CTEs compared to metals.

It is a common practice in the development or design of a part or system to pick a material with the best properties for the given application. These properties can be physical such as strength and density or economical such as cost and availability. Differing materials are often used in one mechanical system to optimize different parts of the system. In these systems different material parts will be fastened together. These differing materials will have differing thermal expansions. When this system experiences a change in temperature the differing materials will have differing amounts of thermal strain or thermally induced change in length. Since the materials are rigidly fastened together this strain becomes a stress in the parts based on Hooke's law, $$\sigma = E(\epsilon_1 - \epsilon_2)$$

where
   $\sigma$=stress
   E=modulus of elasticity
   $\epsilon_1$=strain material 1
   $\epsilon_2$=strain material 2.

Most mechanical systems only require that the fastened joint does not fail under the thermal stresses. This is easily accomplished by altering the shape and size of the fastened components and the fasteners. However, for stress sensitive instruments, very small stresses in the components can cause instrument errors and failure.

Current methods to compensate for the stress and deformation of joined structures generally address linear expansion and contraction. For example, steel railroad rails, if laid in contact end to end would buckle on hot days as the result of thermal expansion. Most tracks are built from pieces of steel supported by wooden ties, and laid with a space between the ends. This space provides a buffer for thermal expansion, allowing the rail to elongate without contacting the next rail. Another example of a method to compensation for thermal expansion is expansion joints. Bridges are built with metal expansion joints, which contain gaps between bridge sections that allow for expansion and contraction without causing faults in the overall structure of the bridge.

For cryogenic optical testing chambers in which high performance Silicon Carbide mirrors are used, it is desired to reduce mirror errors caused by thermal gradients. However, the chamber is built primarily of aluminum and stainless steel which have CTEs that are much different than that of the Silicon Carbide mirrors. Mounting the Silicon Carbide mirrors to the chamber and expecting good performance over a 250 K range is difficult to achieve.

When materials with different CTE are joined, stress and deformation occurs as the result of changes in temperature. Systems have been designed to incorporate a material with an intermediate CTE to reduce the magnitude of the thermal stresses. For example, struts can be designed with a controlled thermal expansion structure that maintains a constant length over a temperature range. If the surfaces of two materials with different CTEs need to be joined, one or more different materials with intermediate CTEs are usually sandwiched between the two surfaces to distribute the thermal stresses at the interfaces, thus resulting is a lower overall stress. Other available technologies to fasten materials with different CTEs involve using flexures to absorb the thermal elastic strain associated with differential thermal expansion rates.

Deficiencies with current methods and technologies for addressing thermal induced stresses in joined structures are associated with the linear nature of the solutions which are not applicable to non-linear structures. For non-linear structures, the use of an intermediate layer distributes the thermal induced stress to the interfaces but only reduces the magnitude of the thermal stress in the structure. Therefore a thermal expansion compensation method and system is needed to compensate for, and eliminate, thermal induced stresses in systems composed of materials with different coefficients of thermal expansion.

SUMMARY OF THE INVENTION

A thermal compensation method and system that eliminates thermal induced stresses in structures composed of different materials fastened together is disclosed. The system utilizes three compensation mounts made from a material with a coefficient of thermal expansion (CTE) that is between that of the two materials being fastened together. The size of the mounts and fastening locations are calculated based on the coefficient of thermal expansion for the two materials being fastened together and the mount material. The geometry of the mounts can be "C" shaped to allow for fastening two planar surfaces without introducing a large thickness increase to the structure. This system allows for materials to be fastened together, and when placed in an environment with temperature fluctuations, the system experiences no or insignificant amounts of thermal induced stresses. Fastening of materials includes all joining methods used to join separate parts together. This includes but is not limited to the use of bolts, screws, rivets, welding, and adhesive bonding.

BRIEF DESCRIPTION OF THE DRAWINGS

Understanding that drawings depict only certain preferred embodiments of the invention and are therefore not to be considered limiting of its scope, the preferred embodiments will be described and explained with additional specificity and detail through the use of the accompanying drawings in which.

DETAILED DESCRIPTION OF SELECTED EMBODIMENTS

Figure 1:
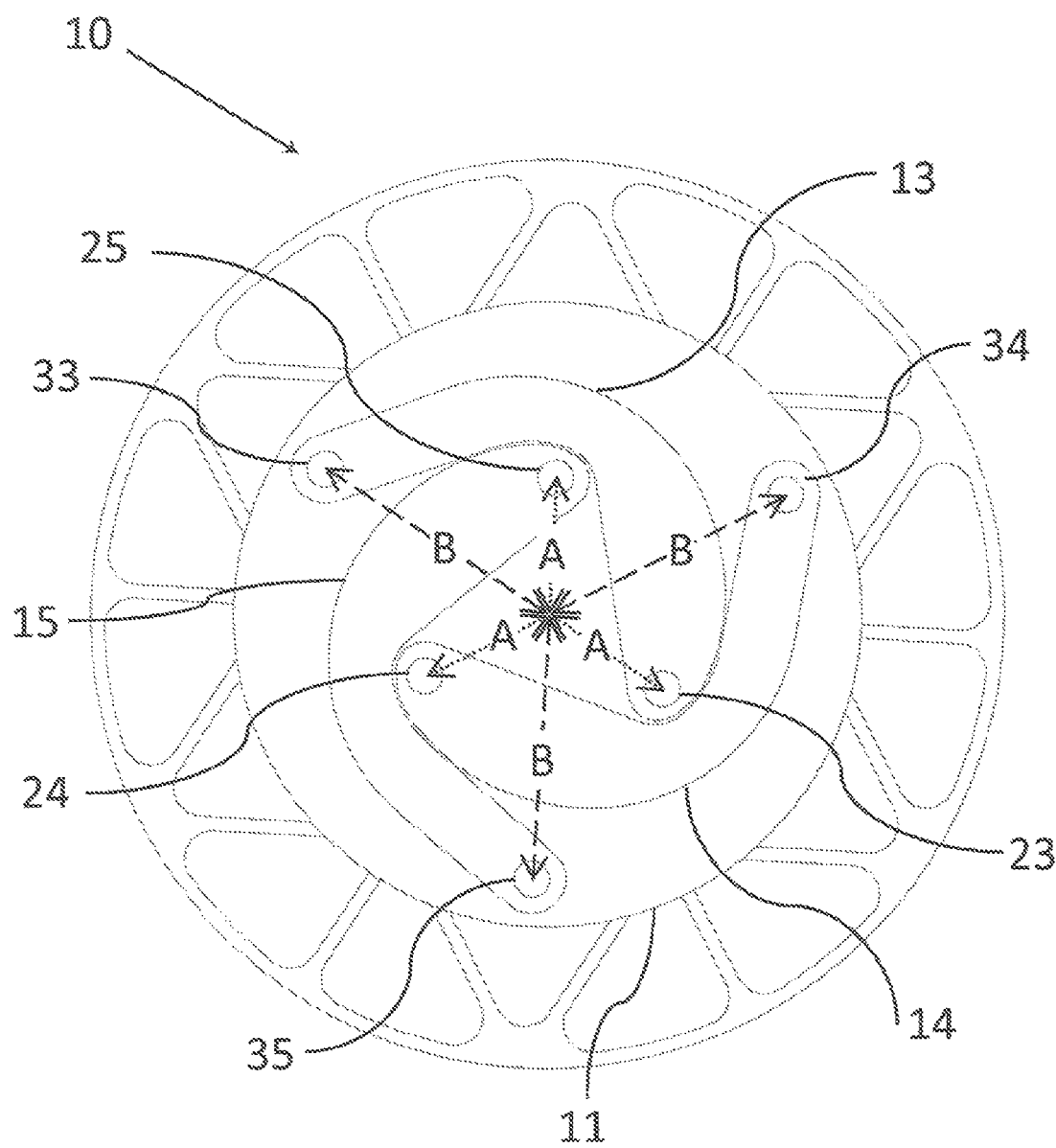
FIG. 1 is a top view of the "C" shaped compensation mount system showing one material to be fastened and the compensation mounts.

In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as represented in the drawings, is not intended to limit the scope of the invention, but is merely representative of the various embodiments of the invention. The invention will be described referring to mounting a silicon carbide component to an aluminum base utilizing an aluminum alloy for the compensation mount members, although the method and system can be applied to any alloys, ceramics, polymers and other materials.

The use of low thermal expansion, brittle materials such as silicon carbide (SiC) in optical instruments has increased the need for improved mounting techniques. The disclosed thermal expansion compensation system utilizes an intermediate thermal expansion material to compensate for the CTE mismatch between the materials being joined. The availability of aluminum alloys with CTEs as low as 12 ppm/K allows the compensation mount for optical instruments to be low mass, low cost and low profile.

A thermal expansion compensation system is necessary for space based optical components, such as the case in which a low CTE telescope material (i.e. SiC, Si, glass, composite) is fastened to an aluminum 6061 bus. Space bound platforms for optical sensors are most often built out of aluminum. Aluminum is lightweight and economical. Aluminum honeycomb composite panels are very light weight and very stiff. The major deficiency of aluminum is that is has a very high coefficient of thermal expansion, around 23 ppm/K. More and more precision instruments such as precision space telescopes are being built out of high performing exotic materials such as SiC and beryllium. SiC is very stiff and brittle. SiC has a low CTE of about 3 ppm/K. In order to mount a SiC telescope to an aluminum honeycomb bench, by existing methods, significant flexures are needed to reduce the thermal elastic stress caused by the great CTE differences of the materials. These flexures require significant volume and are only able to reduce some of the stress. The presently disclosed thermal expansion compensation method and system eliminates the joint's thermal elastic stress based on the compensation mounts fastened between the materials.

The mount material for space based optical platforms can be a low CTE aluminum such as RSA 419 or 443 (CTE's 13-16 ppm/K). Hybrid material telescopes are often used for various reasons, including a thermalizing optical performance, reducing cost, adaptive optics and for other performance needs. Utilizing a hybrid telescope over a large temperature range can be a very difficult engineering problem as the thermal elastic stresses will deform optical surfaces and reduce performance. Utilizing the disclosed thermal expansion compensation method and system, a 6061 aluminum mirror with a CTE of 23 ppm/K can be fastened to a composite mount with a CTE of 2.5 ppm/K and have essentially no surface deformation due to the thermal elastic stress from room temperature to near liquid nitrogen cryogenic temperatures.

Aluminum mirrors which are economical to produce can be fastened to a SiC structure and perform well over a large temperature range using the disclosed thermal expansion compensation technique. In some cases glass mirrors are preferred but this often requires an expensive graphite fiber composite structure. Glass mirrors could be used in an aluminum structure with the use of the disclosed thermal expansion compensation method and system. With both of these hybrid systems, special attention is necessary to assure optical athermal performance over the operating temperature range. Lenses could be utilized to provide this optical athermalization.

In one embodiment, shown in FIG. 1, the thermal expansion compensation system 10 is composed of three separate "C" shaped members. In this embodiment a first component 11 made from a material with a higher CTE is being fastened to a second component (not shown) made from a material with a lower CTE. Three "C" shaped members 13, 14, 15 are machined from a third material having a CTE with a value between that of the first and second materials. The "C" shaped members 13, 14, 15 are fastened with dowel pins (not shown) through one hole at each end of the member. One hole 33, 34, 35 in each "C" shaped member 13, 14, 15 is used to fasten a screw through a hollow dowel pin to the first component 11. The other hole 23, 24, in each "C" shaped member 13, 14, 15 is used to fasten a screw through a hollow dowel pin to the second component. Each member 13, 14, 15 is thus fastened to the first component 11, with the higher CTE using holes 33, 34, and 35 and the second component, with the lower CTE using holes 23, 24, and 25.

The distance from the respective holes to the center of the thermal expansion compensation system, identified as "A" and "B" in FIG. 1, is such that the CTEs of the low expansion material, the high expansion material, and the "C" mount members balance to zero strain and therefore zero thermal elastic stress. The "A" and "B" distances are calculated from the following equation which is the condition at which perfect thermal expansion compensation is achieved.

$$\alpha_M \times (A+B) = \alpha_H \times B + \alpha_L \times A$$

where
 $\alpha_M$=CTE of the mount material
 $\alpha_H$=CTE of the high expansion material
 $\alpha_L$=CTE of the low expansion material
 A=distance from center to one fastening point of the "C" mount, and
 B=distance from center to the other fastening point of the "C" mount.

Figure 2:
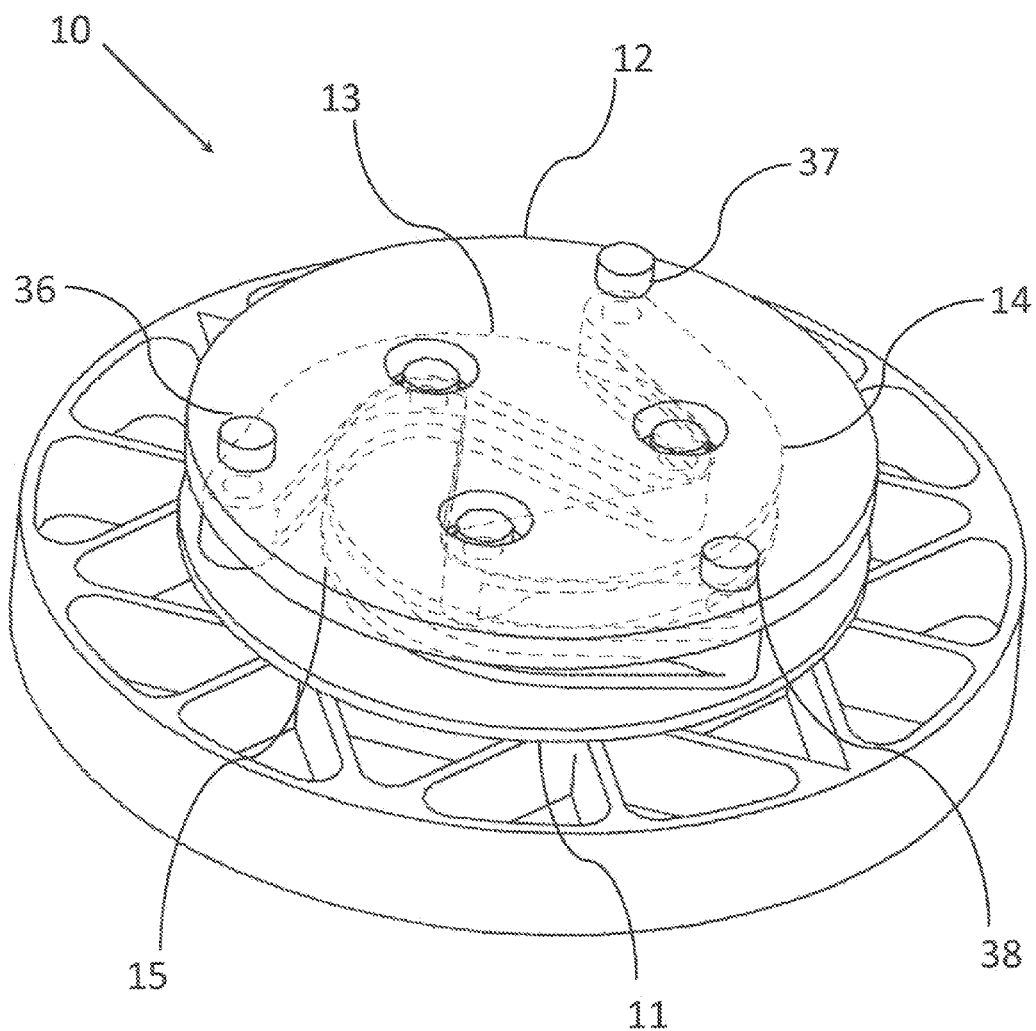
FIG. 2 is an isometric view of the "C" shaped member thermal expansion compensation mount system showing the two components being fastened.

FIG. 2 shows an isometric view of the thermal expansion compensation system 10. The second component 12 is fastened to the first component 11 with the three "C" shaped members 13, 14, 15 between the first component 11 and the second component 12. Fasteners 36, 37, 38 are used to attach the second component 12 to each of the three "C" shaped members 13, 14, 15. Another set of fasteners (not shown) is used to attach the other end of the "C" shaped members 13, 14, 15 to the first component 11.

Figure 3:
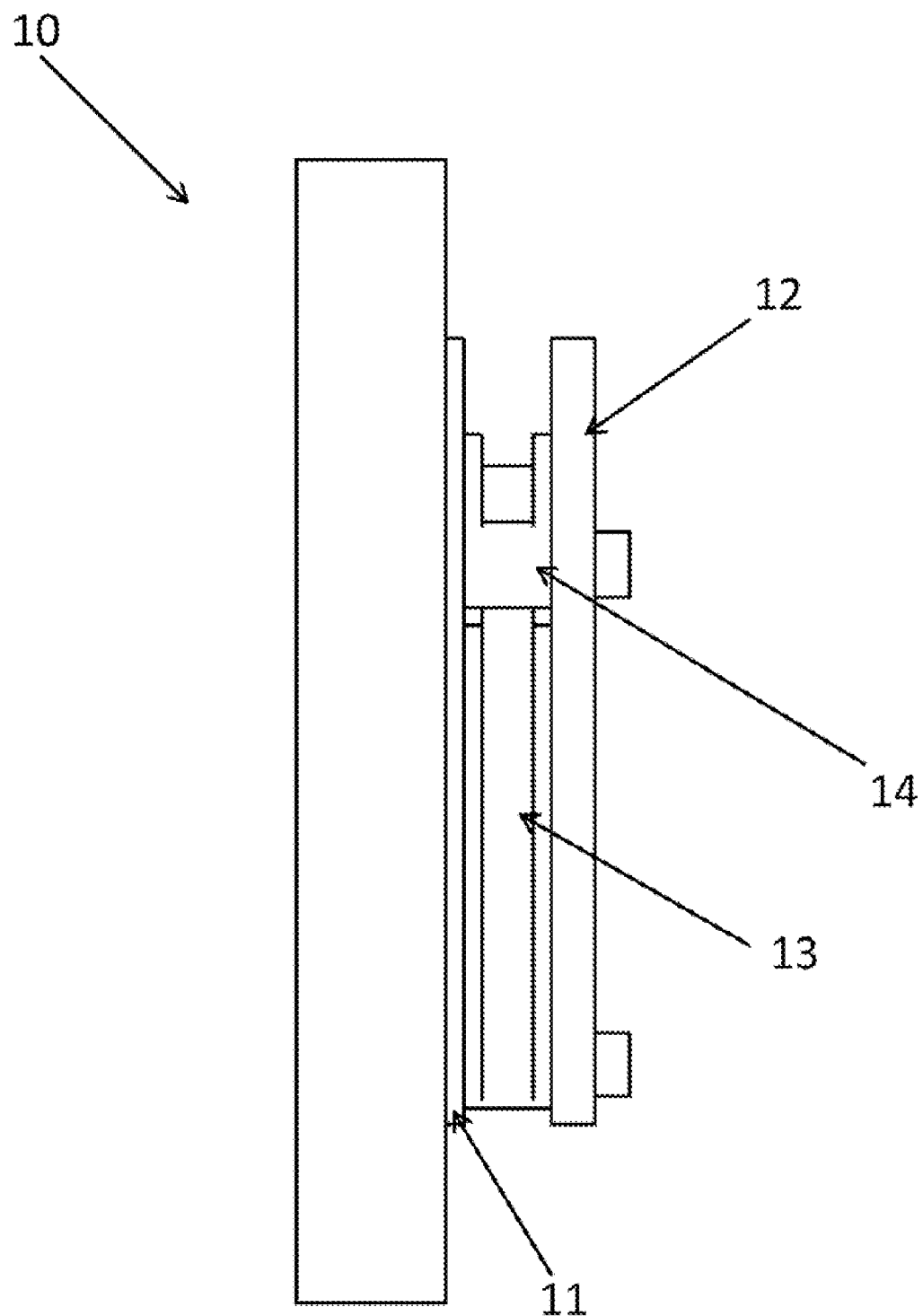
FIG. 3 is a side view of the "C" shaped compensation mount system.

FIG. 3 shows a side view of the thermal expansion compensation system 10. The first component 11 which is made from a material with a higher CTE is fastened to a second component 12 made from a material with a lower CTE by three "C" shaped members 13, 14, 15 with an intermediate CTE. The three "C" shaped members 13, 14, 15 are fastened by screws through hollow dowel pins (not shown) at one end to the first component 11 and by screws through hollow dowel pins (not shown) at the other end to the second component 12. In this embodiment the geometry of the "C" shape members 13, 14, 15 allows for fastening the two components with all three of the "C" shaped compensation mount members co-planar and not overlapping each other, thus not adding significant thickness to the system.

Figure 4:
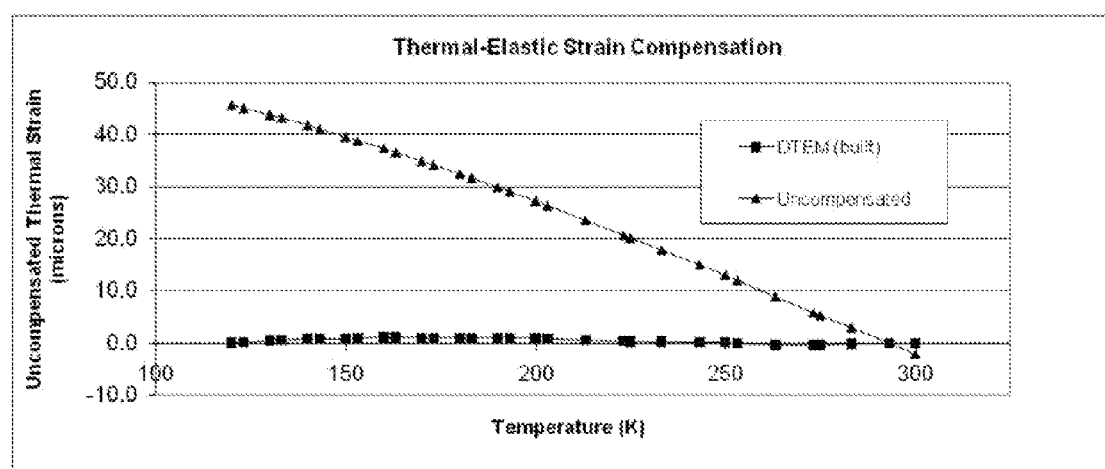
FIG. 4 is a graph showing the calculated thermal strain in an uncompensated structure and a structure with the compensation mounts as a function of temperature.
Figure 5A:
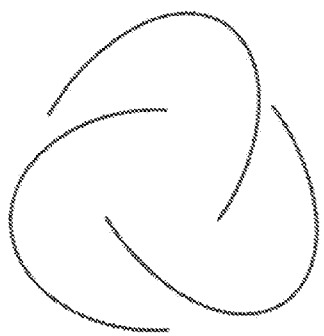
FIG. 5 shows the "C" geometry and several other geometries for the compensation mount system.
Figure 5B:
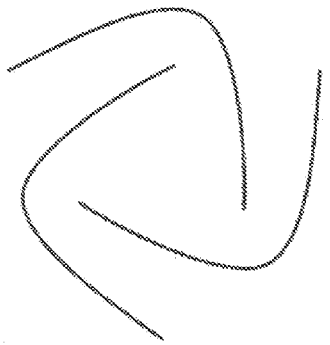
Figure 5C:
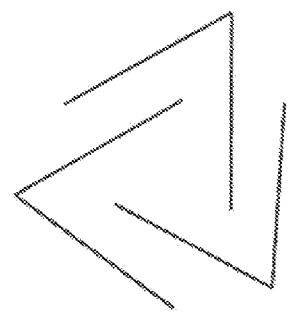
Figure 5D:
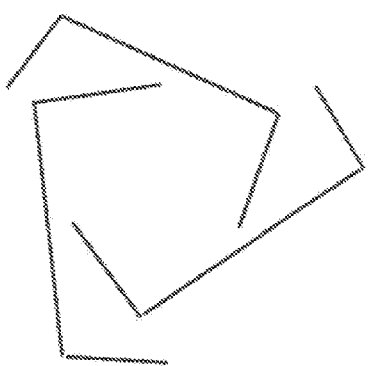
Figure 5E:
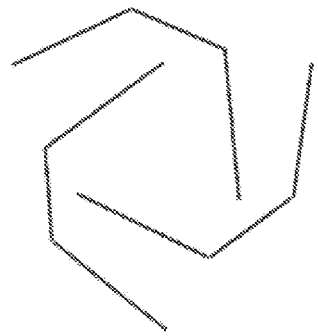

FIG. 4 shows a plot of the thermal strain over a range of temperatures for a system utilizing the disclosed thermal expansion compensation method to be effectively zero. For comparison, FIG. 4 also shows the thermal strain over a range of temperatures for the same materials fastened without utilizing the thermal expansion compensation method.

Fabrication tolerances and coefficient of thermal expansion uncertainty and nonlinearity over the anticipated temperature range may produce some negligible thermal strain which may not be compensated for. It is important that the designer understand the thermal expansion behavior of all three materials in the joint over the temperature range of interest to best compensate for the differing thermal strains. The "C" mount members can have various cross sectional geometries. They can be machined from standard flat plate materials or, for weight savings, can be machined to have two flanges separated by a web similar to an "I" beam to increase their moment of inertia. This way the "C" mounts can be lightweight and very stiff. The "C" shaped geometry allows the compensation system to be constructed without overlapping the mounts, thus maintaining a low profile joint.

This joint is not typical in that the three separate "C" mounts are only fastened to other parts with one fastener at each end of the "C" mount. This minimal amount of fasteners allows rotation in the joint, reducing the stiffness and locating precision of the mount. Dowel pins separated some distance from the fastener cannot be used as they will create a fixed length (distance from the fastener to the dowel pin) that will cause thermal elastic strain in the joint. For this reason for pinning to be successful, the fastener to pin distance must be zero. To satisfy this requirement a hollow pin can be used with the fastener extending through the center of the pin. Both pin and fastener are then coaxial with zero fixed distance between their centerlines. Utilizing hollow pins will enable locating precision in the joint.

The thermal expansion compensation method and system described herein utilizes a "C" shaped geometry for the compensation mount member. The system can be implemented with other appropriate geometries such as, but not limited to, those illustrated in FIG. 5. In addition the first component material being joined can have the lower CTE and the second component can have the higher CTE.

The fastening method described herein to connect the compensation mount members to the two materials consists of a screw through a dowel pin. Any type of fastener known to those skilled in the art can be used, such as but not limited to, screws, bolts, pins, dowels, etc. In addition adhesives and other non hardware joining methods can be used effectively.

Figure 6:
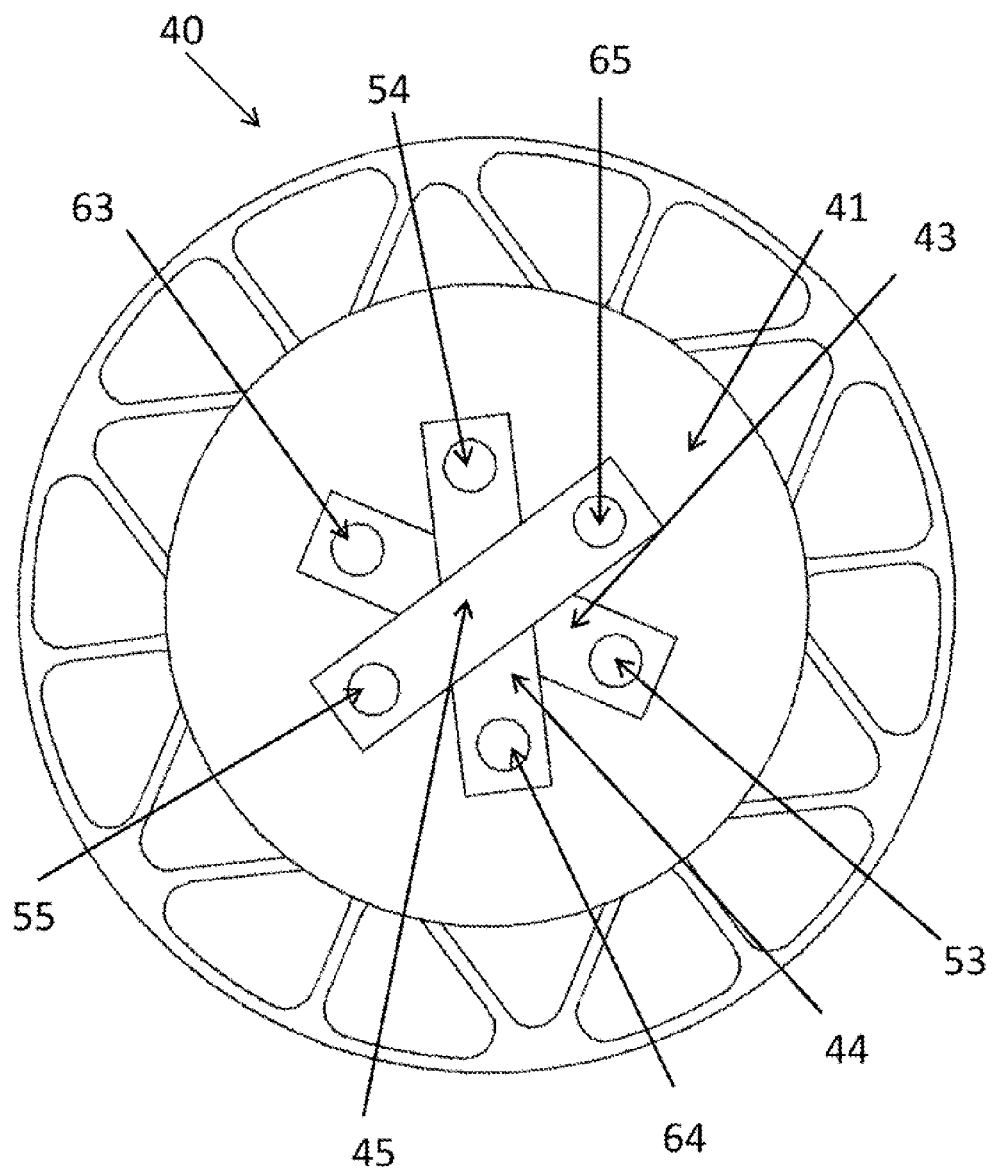
FIG. 6 is a top view of a linear compensation mount system showing one material to be fastened and the compensation mounts.
Figure 7:
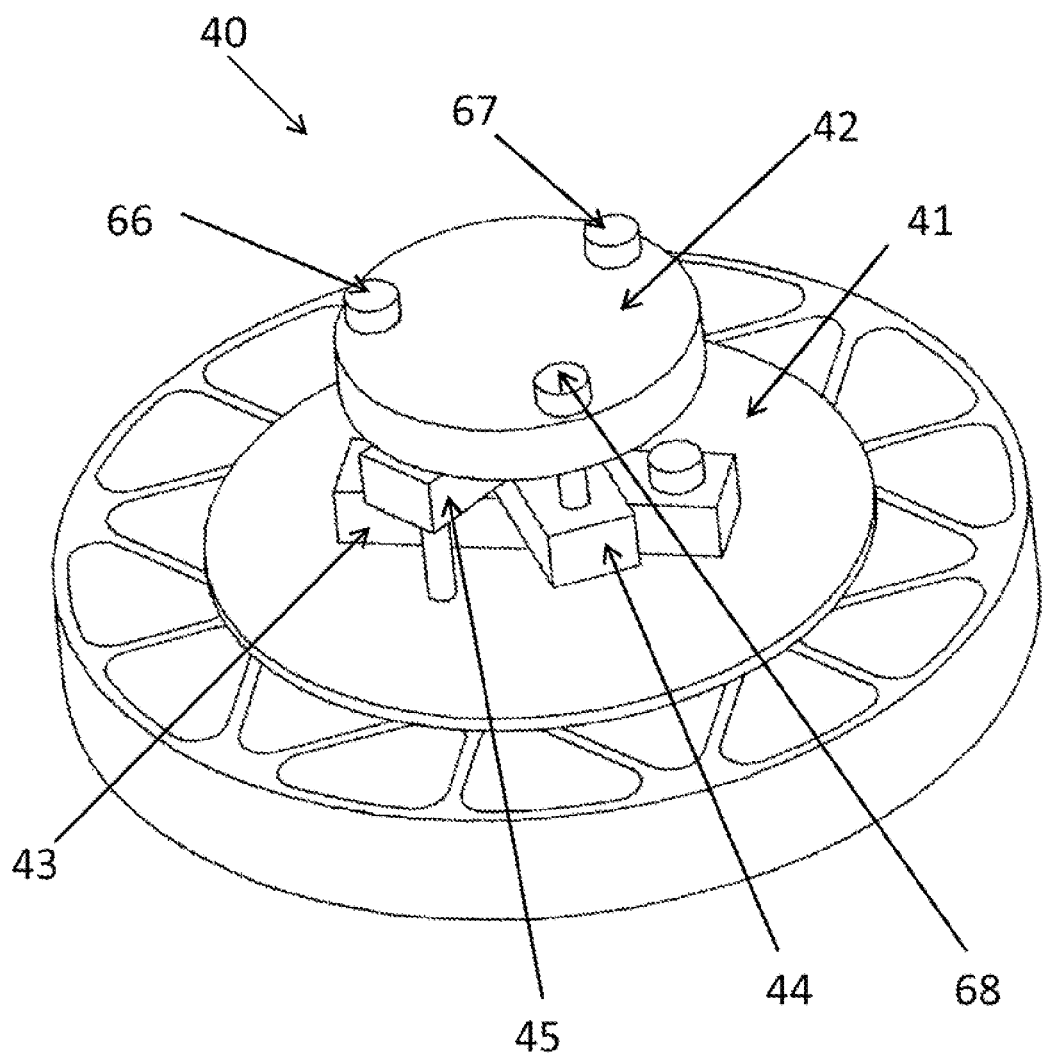
FIG. 7 is an isometric view of the linear member thermal expansion compensation mount system showing the two components being fastened.

The thermal expansion compensation system 40 can be constructed using three linear members 43, 44, 45 as shown in FIGS. 6 and 7. This three linear member embodiment results in a thicker overall structure because the three linear members cannot be co-planar. The first member 43 is positioned adjacent to the first component 41 with the higher CTE. The second member 44 is positioned across the first member 43, at a 60 degree angle and the third member 45 is positioned across the second member 44 at a 60 degree angle. The second component 42 (not shown in FIG. 6) is adjacent to the third member 45. Holes 53, 54, 55 in one end of each compensation member 43, 44, 45 are used to attach it to the first component 41 and holes 63, 64, 65 in the other end of the compensation member 43, 44, 45 are used to attach it to the second component 42 (not shown in FIG. 6) by methods similar to those previously described. Longer pins 66, 67, 68, shown in FIG. 7 are necessary for the raised linear members 43, 44, 45 and there is a greater distance between the two components 41, 42 being fastened together.

Figure 8:
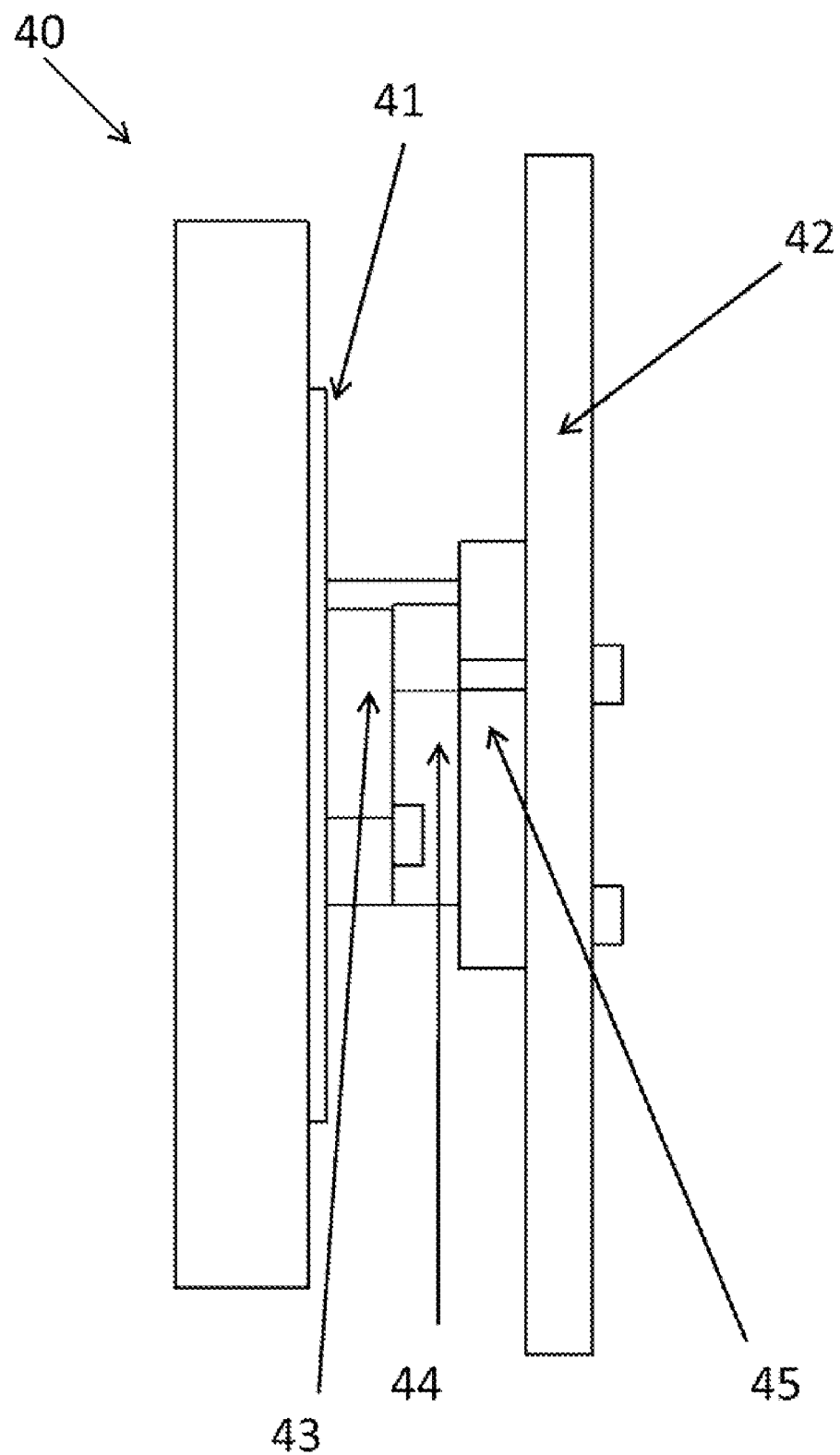
FIG. 8 is a side view of a linear compensation mount system.

FIG. 8 shows a side view of the thermal expansion compensation system 40. The first component 41 which is made from a material with a higher CTE is fastened to a second component 42 made from a material with a lower CTE by three expansion members 43, 44, 45 with an intermediate CTE. The linear structure of the expansion members in this embodiment results in a thicker overall system compared to the previously described system with the "C" shaped members.

Without further elaboration, it is believed that one skilled in the art can use the preceding description to utilize the invention to its fullest extent. Therefore the examples and embodiments disclosed herein are to be construed as merely illustrative and not a limitation of the scope. It will be obvious to those skilled in the art that many changes, such as types of materials, and member and component shapes, may be made to the details of the above described embodiments without departing from the underlying principles of the invention. The scope of the present invention should, therefore, be determined only by the following claims.

The invention claimed is:

1. A system for fastening components with different coefficients of thermal expansion comprising:
    a first component having a planar surface and a first coefficient of thermal expansion;
    a second component having a planar surface and a second coefficient of thermal expansion;
    at least three elongated mount members having a third coefficient of thermal expansion, each elongated mount member comprising:
        a first end and a second end opposite the first end; the first end comprising a first attachment point and the second end comprising a second attachment point; and
        a first planar surface and a second planar surface substantially parallel to the first planar surface, the first attachment point being substantially on the first planar surface and the second attachment point being substantially on the second planar surface;
    wherein said third coefficient of thermal expansion being intermediate between said first coefficient of thermal expansion and said second coefficient of thermal expansion;
    wherein the first attachment point of each said elongated mount member is fastened to the first component and the second attachment point of each said elongated mount member is fastened to the second component; and
    wherein a relative location of the first attachment point to the second attachment point is determined approximately by the equation:

$$\alpha_M \times (A+B) = \alpha_H \times B + \alpha_L \times A$$

where:
    A+B equals the shortest distance between the first attachment point and the second attachment point;
    straight lines from the first attachment point to the second attachment point of each elongated mount member intersect at a common intersection point;
    A equals the shortest distance from the first attachment point of each elongated mount member to the common intersection point;
    B equals the shortest distance from the second attachment point of each elongated mount member to the common intersection point;
    $\alpha_m$ equals the coefficient of thermal expansion of the elongated mount members;
    $\alpha_H$ equals the coefficient of thermal expansion of the first component; and
    $\alpha_L$ equals the coefficient of thermal expansion of the second component.

2. The system of claim 1, wherein the at least three elongated mount members do not overlap, and are co-planar between said first component and said second component.

3. The system of claim 2, wherein the at least three elongated mount members are C-shaped.

4. The system of claim 2 wherein the at least three elongated mount members are V-shaped.

5. The system of claim 1, wherein the at least three elongated mount members have the same dimensions.

6. The system of claim 1, wherein a thermal induced strain is effectively zero for the system over a fifty (50) Kelvin temperature range between approximately 125 Kelvin and 300 Kelvin.

7. The system of claim 1, wherein the at least three elongated mount members are U-shaped.

8. The system of claim 1, wherein the at least three elongated mount members are an arcuate shape.

9. A method for fastening a first planar component to a second planar component, each planar component having a different coefficient of thermal expansion, the method comprising:
    providing a first planar component and a second planar component;
    preparing at least three elongated mount members comprising:
        a first planar surface parallel to a second planar surface;
        a first end and a second end opposite the first end; the first end comprising a first attachment point fastened to the first planar component and the second end comprising a second attachment point fastened to the second planar component, the first attachment point being substantially on the first planar surface and the second attachment point being substantially on the second planar surface; and having a coefficient of thermal expansion between that of said two planar components;
    locating the relative location of the first attachment point to the second attachment point approximately according to the equation $\alpha_M \times (A+B) = \alpha_H \times B + \alpha_L \times A$, where:
        A+B equals the shortest distance between the first attachment point and the second attachment point;
        straight lines from the first attachment point to the second attachment point of each elongated mount member intersect at a common intersection point;
        A equals the shortest distance from the first attachment point of each elongated mount member to the common intersection point; and
        B equals the shortest distance from the second attachment point of each elongated mount member to the common intersection point.

10. The method of claim 9 wherein the at least three elongated mount members do not overlap, and are co-planar between the first planar component and the second planar component.

11. The method of claim 10, wherein the at least three elongated mount members are C-shaped.

12. The system of claim 10, wherein the at least three elongated mount members are V-shaped.

13. The method of claim 9, wherein the at least three elongated mount members are made to have the same dimensions.

14. The method of claim 9 wherein said fastening method is selected from screws, bolts, pins, dowels, and adhesives.

* * * * *